United States Patent [19]
Jones et al.

[11] Patent Number: 5,748,931
[45] Date of Patent: May 5, 1998

[54] INFORMATION DISPLAY SYSTEM FOR SIMULTANEOUSLY DISPLAYING GRAPHICAL IMAGES AND TEXT OF A PUBLICATION

[75] Inventors: Michael William Dudleston Jones, North Ferriby; Nicholas Geen, Hunmanby; Anthony Warner, Driffield; Mischka Hughes, Pocklington, all of United Kingdom

[73] Assignee: Infosis Group Ltd., Yorkshire, England

[21] Appl. No.: 329,948

[22] Filed: Oct. 24, 1994

[51] Int. Cl.⁶ .................................................. G06F 3/00
[52] U.S. Cl. ................................................... 395/356
[58] Field of Search .............................. 395/144, 145, 395/147, 326, 356; 345/116, 901

[56] References Cited

U.S. PATENT DOCUMENTS 5,241,624  8/1993  Torras .................................. 395/144
5,347,632  9/1994  Filepp et al. ........................ 395/200
5,553,277  9/1996  Hirano et al. ....................... 395/147

Primary Examiner—Mark R. Powell
Attorney, Agent, or Firm—Ostrager, Chong & Flaherty

[57] ABSTRACT

An information display system uses data comprising graphical images of pages of a publication and text data. The images comprise images of both text and non-text matter, where the text matter includes a plurality of predefined passages of text, and the text data comprises the plurality of predefined passages of text. A display is provided to simultaneously display at least a part of a page of the image and a selected predefined passage of text. A user operable selector is provided to enable a user to select a portion of the page of the image displayed by the display whereby the display simultaneously displays the selected predefined passage of text as well as the page of the image.

27 Claims, 7 Drawing Sheets

FIG. 2

PREVIOUS NEXT
STORY STORY        CONTENTS        PREVIOUS  NEXT
                                   PAGE      PAGE                                           PAGE PREVIEW

BUSINESS DAY   EVENING STANDARD

PAGE
NUMBER — 34   Companies referred to in this edition

Air Canada
Air India, Icelandair
Air New Zealand
American Airlines ——— COMPANY INDEX (MOUSECLICK
Arjo Wiggins                ON COMPANY NAME GOES TO
Barclays Bank               FIRST REFERENCE IN EDITION
Barratt Developments        TO THAT COMPANY.
Bright Reasons              DISPLAYS PAGE PREVIEW TO
British Aerospace           RIGHT AND STORY, WITH
British Airways             COMPANY REFERENCE
Canadian Airlines           HIGHLIGHTED, IN THIS FIELD.
Exco                        (COMPANY NAME INSERTED
GEC                         TO 'FIND' FIELD FOR
Geneva                      CONTINUING SEARCH).
GUS
Hong Kong
Kuala Lumpur's
Laporte
Laporte
Las Vegas
Lugano
Mirror Group

BUSINESS DAY, 141-143 DRURY LANE, LONDON WC2B 5TS, TEL:071-938 6902

COMPANY... FIND     FIND: STRING ENTRY FIELD

COMPANY INDEX   FIND (FIND TEXT
                STRING IN ANY STORY)

INFORMATION DISPLAY SYSTEM FOR SIMULTANEOUSLY DISPLAYING GRAPHICAL IMAGES AND TEXT OF A PUBLICATION

FIELD OF THE INVENTION

The present invention relates to an information display system and more particularly to an information display system which provides for the simultaneous display of a graphical representation of a printed publication, or part of a publication and text data appearing in the printed publication.

BACKGROUND TO THE INVENTION

In today's society, particularly in the business community, it is a necessity to receive published information as quickly as possible. This is especially important for financial information. Thus, the desire to provide such information in electronic form has expanded rapidly in recent years.

In the United Kingdom, there are a number of suppliers of news information delivered electronically for on-screen or other media consumption. These can be segmented into a number of categories:

(a) an electronic text feed of general and specific news items, and data where the only structure consists of headers detailing news category orders (e.g. Press Association);

(b) an electronic text feed of news items addressing specific market sectors (e.g. Extel Finance);

(c) an electronic text feed (not in real time) providing the textual information contained in previously published material. This information provided for archival and search activity as a primary facility (e.g. FT Profile).

The common component of these information provisions being their emphasis on editorial quantity, leaving the editorial and sub-editorial functions to the consumer. Essentially they are providers of a raw material to be used by the customer base as one of their ingredients for the production of their products, or as data for customers to filter to generate information for their own internal or external use. This, with this vast quantity of raw data provision with no relative importance attached to each of the individual news items, the user is formed to sift through irrelevant and/or unimportant information to discover their requirement. Additionally, the feeds are, in general, specifically objective rather than subjective.

A further disadvantage of this method of supplying information is that only text information can be provided. The foregoing problems of prior art information systems manifest the need for improvement. Specifically, there is a need for an information display system that can make use of information provided in publications such as newspapers and magazines in real time thereby benefiting from the editorial experience of the publishers. Furthermore, since a great deal of information can be obtained from the editorial layout of the publication, the foregoing need can be greatly enhanced by the provision of a simultaneous image of the actual publication together with the actual text in the clear and legible form.

SUMMARY OF THE INVENTION

The present invention provides a screen based information display system which utilizes both the graphical images of pages of a printed publication as well as its text data. The present invention allows for the simultaneous display of an image of the pages of a publication and text data. It is not sufficient merely to provide a readable image of the pages of the publication as this only provides a microfiche representation. Whereas this allows the user to read the text, it does so at a representational level which does not give the overview perspective. The user "cannot see the wood for the trees", is a realistic analogy. The purpose of providing a simultaneous image of the publication is to allow the user to interpret the editorial importance that has been attached to articles, thereby allowing the user to benefit from the editorial experience of the publishers, as well as giving immediate access to the edited text.

The present invention allows for a user to select a passage of text comprising an article or story on the displayed page of the publication whereby the system of the present invention will simultaneously display the text of the passage adjacent to the image of the full page of the publication. This allows the user to clearly read the article if desired. In view of the small size of the image of the page of the publication the text is not clear and therefore it is highly advantageous to provide a clear copy of the text separately. The provision of the text separately also allows for further advantages of the present invention including allowing for identifier words such as company names to be clearly seen e.g. highlighted. The present invention provides for further information on the identifier word e.g. company information to be displayed, by the selection of the identifier word. The further information e.g. company reports, can then be displayed simultaneously with the image of the page of the publication.

A further feature of the present invention is that a list of contents of the pages of the publication can be displayed, wherein the list of contents for each page are displayed such that the passages of text (articles or stories) are listed in the order of importance which can be attached to them by the way in which they are formatted on the page of the publication by the editors. Thus, the list of contents for the publication provided by the present invention provides for an easy means for the important passages in the publication to be identified by a user. When a particular passage is identified which the user wishes to read, this can be selected and the text displayed along with the image of the page of the publication from which the text is taken.

The present invention is particularly applicable to business and financial publications such as newspapers. For example, in London in the United Kingdom, the Evening Standard is published seven times during a day with the financial information in each publication being updated. Electronic data on each publication can be obtained rapidly from the publisher thereby allowing the information display system of the present invention to be updated rapidly in response to each new edition. The present invention thus removes the need for financial institutions to have to purchase multiple hard copies of the newspaper. Instead, the information can be provided electronically over a network to as many users in the institution as is required. Furthermore, the information provided is in a far more user friendly form than the original hard copy and reaches the user rapidly, even where the publication is printed some distance from the desired user, e.g. overseas.

BRIEF DESCRIPTION OF THE DRAWINGS

FIG. 2 illustrates a display generated during the operation of the system illustrated in FIG. 1;

FIG. 4 illustrates a further display generated by the system of FIG. 1;

FIG. 5 illustrates yet another display generated by the system of FIG. 1;

DETAILED DESCRIPTION

Figure 1:
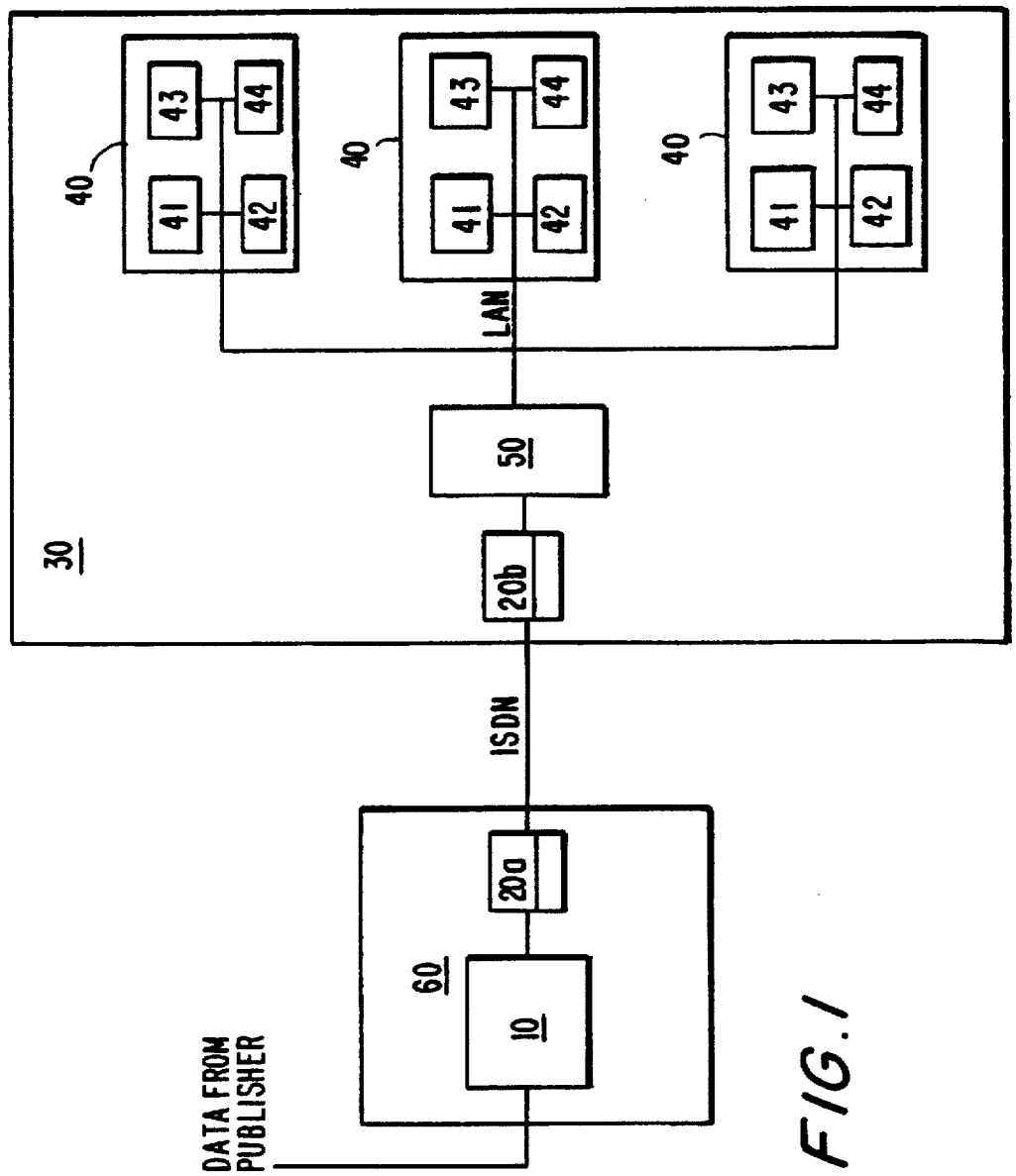
FIG. 1 illustrates an exemplary embodiment of a system for implementing the present invention.

Referring now to the drawings, and initially to FIG. 1, there is illustrated an exemplary embodiment of a system for implementing the present invention. Data is received from the publisher in electronic form by the central storage and processor unit 10. Whilst it is highly desirable that the data be obtained from the publisher in electronic form, it is not essential to the principle of the present invention. Any means of providing images of the publication and separate text data will suffice.

Within the central storage and processor unit 10, portions of each page of the image which correlate to passages of text are defined and the defined portions are correlated with the passages of text. A list of contents for the passages of text is then generated by selecting the headings from each passage of text and ordering these in order of importance which can be attached to each passage of text by studying the image of the page of the publication. For instance, where an article has the largest heading in the publication of a newspaper, clearly this is the most important story of that page. Similarly, if an article has the smallest heading, this is the least important story on that page and is thus placed at the end of the list of contents for that page. Once the list of contents is generated, this is stored for later assimilation into the invention.

The image received from the publishers or obtained from the publication requires enhancement of visual quality and therefore in an embodiment of the present invention the received image is sharpened to improve the definition and therefore make it clearer when displayed.

Within the text information there will be certain words such as company names which can serve as identifier words for which the central storage and processing unit 10 has further information which can be made available to the user. Therefore, the text data which is received from the publisher is searched and compared with known identifier words such as company names. The identified identifier words are then flagged in the text and are also entered into an index which is then stored for later assimilation into the invention.

Additionally, within the page images and text information, there will be stock market equity price information from a variety of Stock Exchanges around the world, together with the price movement on those equities. These prices and price movements will be those standing at the time of the publication of the newspaper. Within the central storage and processing unit 10 there is additional information on many equity companies, including the current real time price of these equities.

Therefore, the text data and the images which are received from the publisher is searched and the particular companies used within the publication identified and the further information and real time price data within the central storage and processing unit 10 can be made available for the user when assimilated into the invention.

Thus, the information that is available from the central storage and processing unit 10 is a series of images of pages of the publication, the text corresponding to the articles or passages in the publication, which passages of text have been correlated with the particular portions in the image, a list of contents of the passages of text listed in order of importance for each page, an identifier word index identifying the words e.g. company names in the text for which further information is available, and further information on the identifier words e.g. company prospectuses or statistical information together with real time equity price and other information on the companies within the market price pages of the newspaper.

The series of steps to compile this data will be carried out for each publication. Thus, in the case of a newspaper for which there are several publications in a day, this process must be carried out each publication as quickly as possible in order that the information can be made available to users without delay.

The central storage and processing unit 10 can then communicate the stored information using a communication link 20a and 20b to a single user or group of users 30 such as a financial institution. In FIG. 1 the communication link is a high speed ISDN telephone line. However, any form of communication can be used such as cable, satellite or radio. Typically, in such an institution where a plurality of users require information, each user will be provided with a personal computer or terminal 40 which is connected via a local area network (LAN) to a central processor which is for instance a file server 50 which receives the information via the communication link 20a and 20b from the central storage and processing unit 10.

Thus, each personal computer or terminal 40 has access to all the information available from the central storage and processing unit 10 at the remote location 60. Each personal computer or terminal 40 comprises a central processor unit 41, a memory 42, a display 43 and an input device 44 such as a keyboard and/or a pointing device such as mouse or tracker ball.

In order to make the interface of the computer system with the user as easy as possible, according to one embodiment of the present invention, the software utilized in the personal computers 40 operates on the basis of displayed icons which illustrate and control the running of options and which are selectable and operable by a pointing device such as a mouse. However, the present invention is not limited to the use of a cursor movement device such as a mouse and instead any means of inputting selections and commands, e.g. a keyboard falls within the scope of the present invention.

Figure 2:
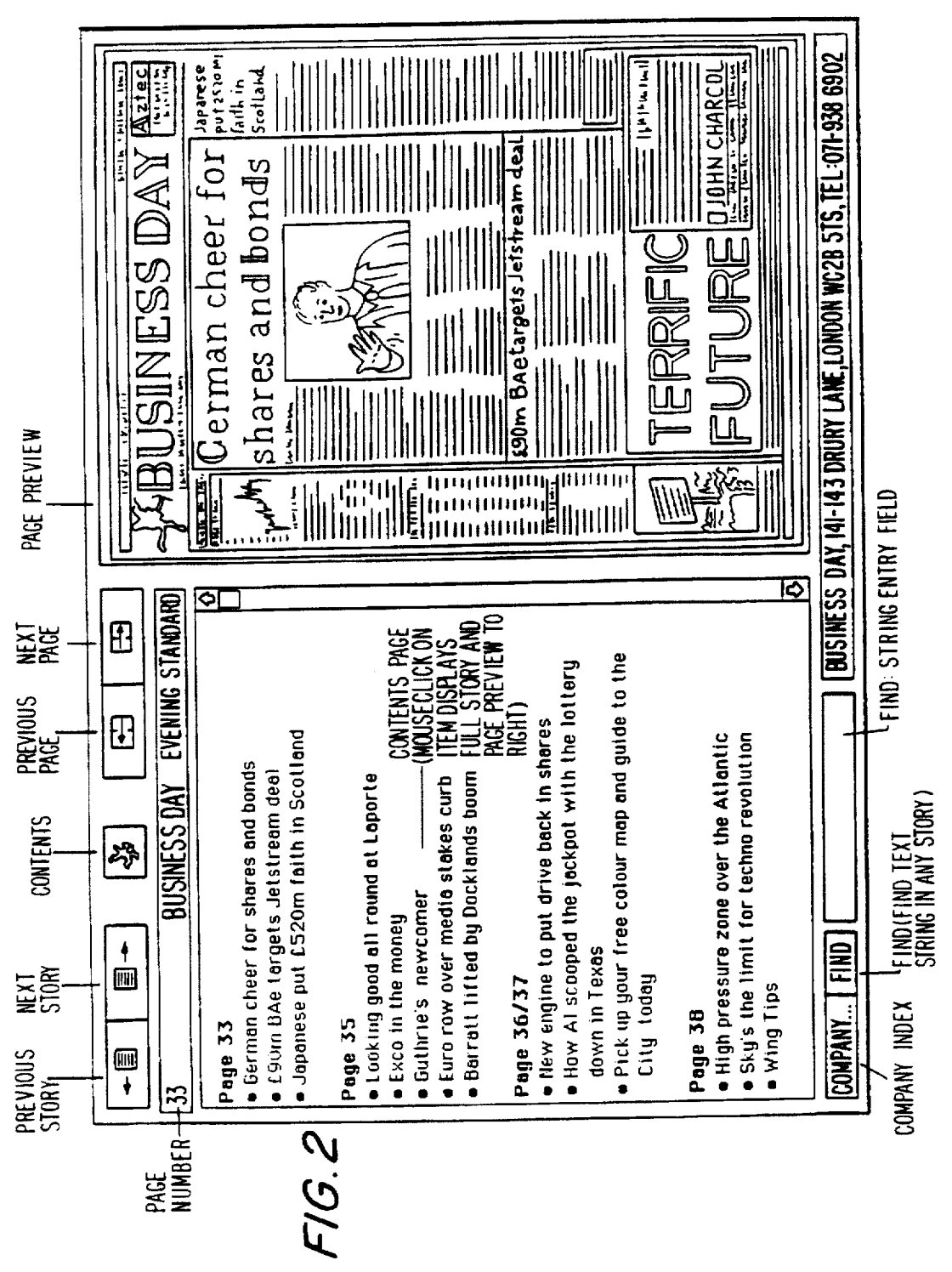

Referring now to FIG. 2, there is disclosed an image which is displayed when the embodiment of FIG. 1 is in operation. On one half of the screen there is a page preview of a page of the publication and the page number (page 33) is indicated as well as the title in the top left-hand part of the display. In the left-hand part of the screen there is displayed a list of contents for the pages of the publication listed by page number and for each page number the articles are listed in order of importance. The list of contents can be scrolled up or down and the next and previous pages of the publication shown on the page preview on the right-hand side of the display can be selected, although in this Figure there is no previous page since this publication has no pages prior to page 33. The display of the list of contents is selectable by selecting the contents option at the top left-hand part of the display by moving the cursor and depressing the mouse button i.e. "clicking" on that icon. It is also possible to select an article on a page to be displayed by moving the cursor to point out the article listed in the contents and clicking on it. This will display the text of the article in the left-hand part of the display whilst in the right-hand part of the display the image of the page on which the article appears will be shown.

Figure 3:
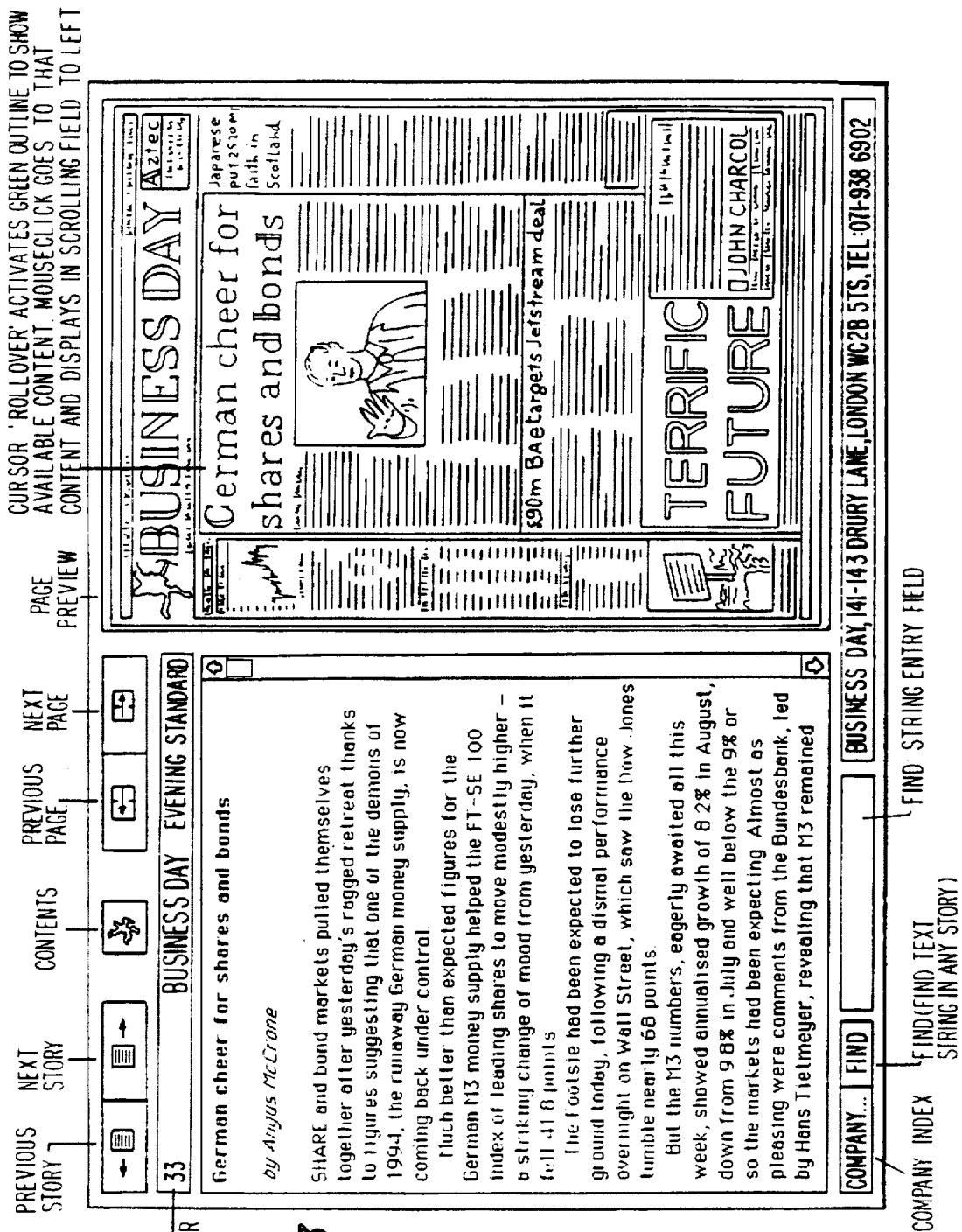
FIG. 3 illustrates another display generated by the system of FIG. 1.

Referring now to FIG. 3, in this display the article headed "German cheer for shares and bonds" has been selected by moving the cursor to the portion of the image and clicking on it. The image is then highlighted by surrounding the portion with a coloured border and on the left-hand side of the screen the text of the article is displayed. The text displayed can be scrolled up or down in a conventional manner. At the top left-hand part of the screen icons are provided to allow either the previous or next story to be selected. In the display of FIG. 3 there is no previous story since the selected story or article is the first of the publication.

Within the story or article there may appear references to companies. When such references occur, these are highlighted in the text and a user can select to view further information on that company by moving the cursor to the highlighted text acting as an identifier word and clicking on it. This will cause the display of further information in at least the left-hand part of the screen. Such further information can for example be a company prospectus or company report.

FIGS. 2 and 3 also show in a bottom left-hand part of the display that the icon "find" is available. Next to this, it is possible to enter a string of text which the user wishes to find within the text of the publication, once the text string is entered in the string entry field and the "find" icon is activated. Once the text string is found within the text, the article in which it appears is displayed in the left-hand part of the display together with the page on which it appears in the right-hand part of the display. The text string within the article is highlighted.

The display in this embodiment of the present invention is provided with the ability to select a company index. This is provided for in the bottom left-hand corner of the screen as a "Company" icon. When this is selected, the display of FIG. 4 is generated. In FIG. 4 in the left-hand half of the screen, an index of the companies referred to in the publication is given. By moving the cursor to a particular company name and clicking on it, text is displayed on the left-hand side in which the first mention of the company name occurs and on the right-hand side of the display there is displayed the associated page of the publication. Where there are a number of publications per day, the index of companies can indicate next to a company name the publication number during the day in which there is a mention of that company. This gives further information on the number of times a company is mentioned in the publications throughtout the day and thus gives an indication on the importance of the activities involving that company.

Figure 5:
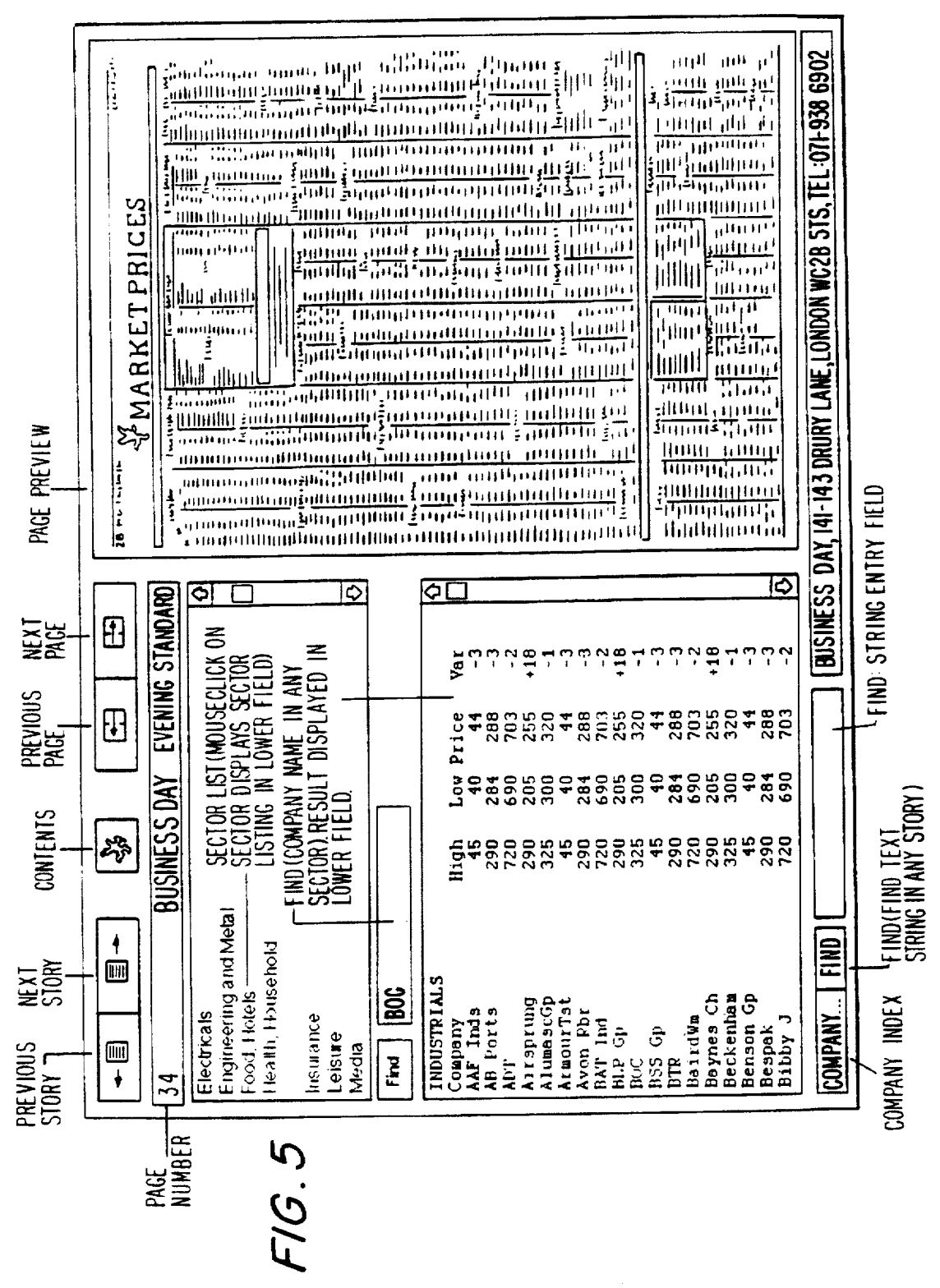

FIG. 5 illustrates a display of financial information in the publication. In the page of the publication the financial sector can be selected and under that sector the financial information on the companies can be displayed. The financial information available can be far and above what is available in the publication since further financial information is available and can be obtained from other sources and collated in the central storage and processing unit to make it available to users.

Figure 6:
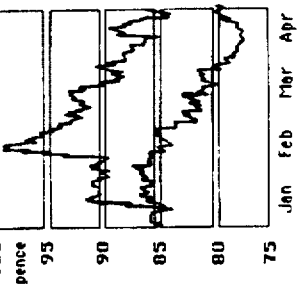
FIG. 6 illustrates a still further display generated by the system of FIG. 1.

Referring now to FIG. 6, this illustrates a further display wherein the text on the left-hand side of the display not only includes highlighted company names but also includes a processed image which originated from the image portion on the page preview on the right-hand side of the display under the heading "Footsie reels from Iraqi shockwaves". The processed image of the graph can be manipulated by the user. Further information over and above what is available from the publication can be included in such processed images. Such further information can be made available from alternative sources and can be combined within the central storage and processor unit 10.

Figure 7:
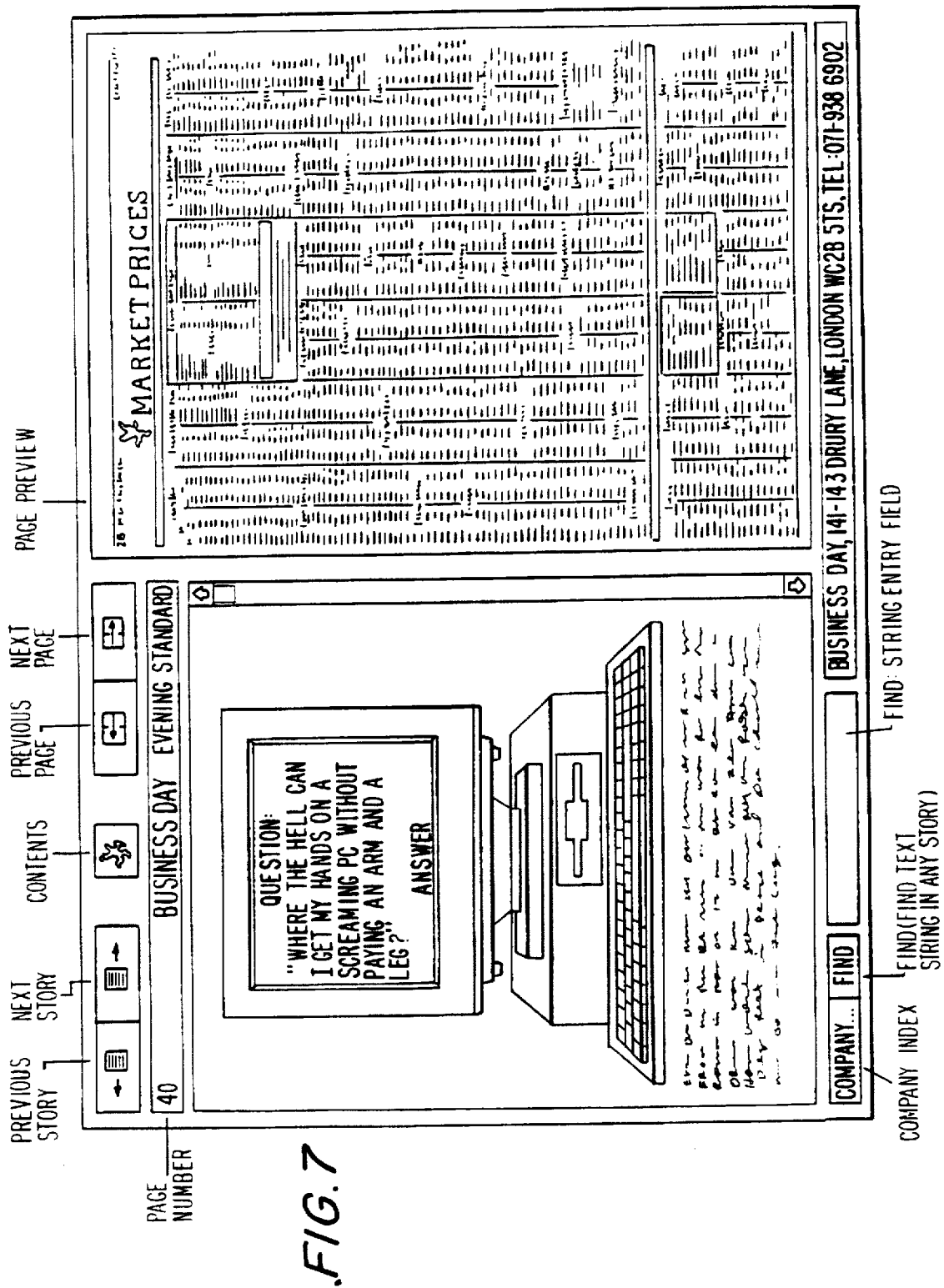
FIG. 7 illustrates another display generated by the system of FIG. 1.

Referring now to FIG. 7, this illustrates a further display wherein further information over and above what is available in the publication is selected and displayed. In the page preview on the right-hand side of the display there is an advert for a computer manufacturer. When the cursor is moved to this portion of the image and clicked on, further information which comprises further advertisement information is displayed in the left-hand side of the display.

When the option of requesting further information is selected, the software moves out of the current application and into another application containing the required additional information. Such further information can take any form such as graphical, textural and video information, thus allowing the present invention to operate as a multi-media software system. Thus, the information display system of the present invention, by providing both a graphical image of a publication and the text data, acts as a gateway through the publication into a vast array of further information which can be made available to the user via the central storage and processing unit 10.

The present invention can be implemented by providing each user with a personal computer linked to a central file server to provide the necessary information as shown in FIG. 1. The personal computer can be a Macintosh System 7 with a 256 colour video screen or an IBM (Registered Trade Mark) compatible 486 based computer having at least 8M Bytes of RAM and a 256 colour video screen. Typically the data received from the publisher is provided as Pagespeed files (Pagespeed being the proprietary software of Digital Technology International) which comprise typeset images of the pages of the publication. The text is extracted from these images and formatted in the processing unit 10, which can comprise a personal computer as described above, using the program given in Appendix 1. The images are also processed by processing the encapsulated postscript files to form 72 DPI bitmaps. The image processing can be carried out using picture processing software such as Adobe Photoshop. The processed image and text data is then communicated to the users. The software run on the users personal computers is an executable file produced using Macromedia Director by Macromedia Inc. The script files given in Appendix 2 are run by the software to provide the user with the ability to view an image of the publication and the text simultaneously and obtain further information in accordance with the present invention.

It should be understood that the foregoing description of the present invention is meant to be illustrative only. Thus, although only a few examples of the present invention have been described in detail, it is clear that the features of the present invention may be adapted to many different situations without departing from the spirit of the invention.

- 12 -
APPENDIX 1

```
/****************************************************
 *
 * Project : lesindex
 * File Name: lesindex.c
 * Abstract:
 * Process Pagespeed files in order to extract and index company names and
 * headlines from the newspaper stories, and to perform character mappings if
 * necessary.
 * Output is in a format suitable for London Evening Standard Business Day
 * Interactive implemented by Infosis to be imported into Macromedia Director.
 * Revision:   1.0
 * Date:       10/10/94
 *
 * Author:     Mischka Hughes
 *
 * Audit Trail
 *     Rev 1.00 10/10/94 Initial Revision
 *
 ****************************************************
 *
 * All rights reserved. No reproduction, copy or transmission of
 * this program (in source form, compiled form or any other form)
 * and any of the files associated with it, may be made without
 * written permission from the author.
 * No sub-section of this program (in source form, compiled form or
 * any other form) and any of the files associated with it, may
 * be reproduced, copied or transmitted save with written permission
 * from the author, or in accordance with the provisions of the
 * Copyright Act 1956 (as amended).
 * Any person who does any unauthorised act in relation to this
 * program (or the associated files) may be liable to criminal
 * prosecution and civil claims for damages.
 *
 *
 * (C) Infosis 1994
 *
 ****************************************************/ include <stdio.h>
include <fcntl.h>
#include <stdlib.h>
#include <search.h>
#include <ctype.h>
#include <dir.h>
include <string.h> define COMPANY_IDX   "company.idx"
define HEADLINE_IDX  "headline.idx"

#define MARKET_REPORT   "MARKET REPORT"
#define ANALYSIS        "ANALYSIS"

define CONTROL         0x07 define PS_APPOS        0xd5
```

- 13 -

```
define PS_THIN_SP      0x1a define MAC_THIN_SP     0xCA
define MAC_OP_APPOS    0xD4
#define MAC_CL_APPOS    0xD5
#define MAC_OP_D_QUOTE  0xD2
define MAC_CL_D_QUOTE  0xD3 define LINE_END        "\r\n"

define MAX_COMPANY_NAME_LEN    100 char **arglst;

FILE    *infile;
FILE    *outfile;
FILE    *c_idx_fp;
FILE    *h_idx_fp;
int     p_no;
int     story_no;

char    buf[3000];
char    str_buf[3000];
char    hl_buf[3000];

int     buf_pos=0;
int     str_buf_pos=0;
int     hl_buf_pos=0;
int     hl_len;

void buf_add(ch)
{
 buf[buf_pos++]=ch;
} void buf_end()
{
 buf[buf_pos]='\0';
 buf_pos=0;
} void hl_buf_add(ch)
{
 if (ch==PS_THIN_SP) hl_buf[hl_buf_pos++]=' ';
 else hl_buf[hl_buf_pos++]=ch;
} void hl_buf_end()
{
 hl_buf[hl_buf_pos]='\0';
 hl_buf_pos=0;
} void str_buf_add(ch)
{
```

- 14 -

```
if (ch==PS_THIN_SP) str_buf[str_buf_pos++]=' ';
else str_buf[str_buf_pos++]=ch;
} void str_buf_end()
{
 str_buf[str_buf_pos]='\0';
 str_buf_pos=0;
} void append_to_index()
{
 int len;
 char *ch;

len=strlen(str_buf);
 if (len==0) return;
 len--;
 // strip trailing non-alpha chars
 while (len!=0 && !isalpha(str_buf[len])) {
   str_buf[len]='\0';
   len--;
 }
 ch=str_buf;
 // skip leading non-alpha chars
 while (*ch && !isgraph(*ch)) ch++;
 if (!ch) return;
 // if is lower then not a company name
 if (islower(*ch)) return;
/*
 // dot-dot routine for ling lines
 if (strlen(ch)>MAX_COMPANY_NAME_LEN) {
   ch[MAX_COMPANY_NAME_LEN]='\0';
   ch[MAX_COMPANY_NAME_LEN-1]='.';
   ch[MAX_COMPANY_NAME_LEN-2]='.';
 }
*/
// fprintf(c_idx_fp,"%d     %s%s",p_no,ch,LINE_END);

// specific headline alterations
 if (strncmp(hl_buf,MARKET_REPORT,strlen(MARKET_REPORT))==0) {
   fprintf(c_idx_fp,"%s - MARKET REPORT%*sp%ds%d *%s"
      ,ch,100,"",p_no,story_no,LINE_END);
 }
 else if (strncmp(hl_buf,ANALYSIS,strlen(ANALYSIS))==0) {
   fprintf(c_idx_fp,"%s - ANALYSIS%*sp%ds%d *%s"
      ,ch,100,"",p_no,story_no,LINE_END);
 }
 else fprintf(c_idx_fp,"%s%*sp%ds%d *%s",ch,100,"",p_no,story_no,LINE_END);
}

// add character to headline index
void add_ch_to_hl_idx(int ch)
{
 // output headline char to buffer and file
```

- 15 -

```c
// convert CR to a space as newlines appear in the titles
if (ch==0x0d) {
  fputc(' ',h_idx_fp);
  hl_buf_add(' ');
}
else if (ch==PS_THIN_SP) {
  fputc(' ',h_idx_fp);
}
else {
  fputc(ch,h_idx_fp);
  hl_buf_add(ch);
}
hl_len++;
}

// main convert routine
void convert()
{
int ch;
int in_command=0;
int add_to_index=0;
int add_to_hl_idx=1;
int in_d_quotes=0;

hl_len=0;
hl_buf_end();
// fprintf(h_idx_fp,"%d     ",p_no);
for (;;) {
  ch=fgetc(infile);
  if (ch==EOF) break;
  // detect end of headline
  if ((ch=='`' || hl_len==80) && add_to_hl_idx) {
    fprintf(h_idx_fp,"%*sp%ds%d *%s",100,"",p_no,story_no,LINE_END);
    add_to_hl_idx=0;
    hl_len=0;
  }
  // inside control chars may be a f+b i.e. bold on/off
  // if so we assume this is a company name and add it to the company
  // index
  if (ch==CONTROL) {
    if (in_command) {
        buf_end();
        if (strstr(buf,"f+b")!=NULL) {
          add_to_index=1;
          //fputc('[',outfile);
        }
        else if(strstr(buf,"f-b")!=NULL) {
          add_to_index=0;
          //fputc(']',outfile);
          str_buf_end();
          // append the company to the index
          append_to_index();
        }
    }
    in_command^=1;
```

```
                                       - 16 -
 } else {
   if (in_command) buf_add(ch);
   else {
       switch (ch) {
         case PS_THIN_SP:
           fprintf(outfile," ");
           // fputc(MAC_THIN_SP,outfile);
           // fputc(MAC_THIN_SP,outfile);
           // fputc(MAC_THIN_SP,outfile);
           break;
           case '': break;
         default: fputc(ch,outfile); break;
       }
       if (add_to_index) str_buf_add(ch);
       if (add_to_hl_idx) add_ch_to_hl_idx(ch);
   }
  }
 }
}
//ncmp is the compare routine for qsort
int ncmp(const void *a,const void *b)
{
 char **aa;
 char **bb;
 int p_no_a,p_no_b;
 int s_no_a,s_no_b;
 char *story_pos_a;
 char *story_pos_b;
 aa=(char **)a;
 bb=(char **)b;
 p_no_a=atoi(*aa+1);
 p_no_b=atoi(*bb+1);
 if (p_no_a!=p_no_b) return (p_no_a-p_no_b);
 story_pos_a=strchr(*aa,'S');
 story_pos_b=strchr(*bb,'S');
 s_no_a=atoi(story_pos_a+1);
 s_no_b=atoi(story_pos_b+1);
 return (s_no_a-s_no_b);
} main(int argc, char * *argv)
{
 int i;
 int old_p_no=-1;
 char drive[MAXDRIVE];
 char dir[MAXDIR];
 char file[MAXFILE];
 char ext[MAXEXT];
 char *story_part;

arg_st=argv;
 _fmode=O_BINARY;
 // create a company index file
 c_idx_fp=fopen(COMPANY_IDX,"w");
```

- 17 -

```c
  if (c_idx_fp==NULL) {
   perror(COMPANY_IDX);
   exit (1);
  }
 // create a headline index file
 h_idx_fp=fopen(HEADLINE_IDX,"w");
 if (h_idx_fp==NULL) {
   perror(HEADLINE_IDX);
   exit (1);
 }
 // sort the input files into page and story order
 qsort((void *)&argv[1],argc-1,sizeof(argv[0]),ncmp);
 for (i=1;i<argc;i++) printf("%s\n",argv[i]);
 for (i=1;i<argc;i++) {
   if ((infile=fopen(argv[i],"r"))==NULL) {
    perror(argv[i]);
    continue;
   }
   fnsplit(argv[i],drive,dir,file,ext);
   printf("[%s]\n",argv[i]);
//   p_no=atoi(&argv[i][4]);
//   story_no=atoi(&argv[i][8]);
   p_no=atoi(&file[1]);
//   story_no=atoi(&file[3]);
   story_part=strchr(file,'S');
   if (story_part!=NULL) story_no=atoi(&story_part[1]);
   else story_no=0;
//   story_no=atoi(&ext[2]);
   // create a temporary output file
   if ((outfile=fopen("tmp.$$$","w"))==NULL) {
    perror("tmp.$$$");
    fclose(infile);
    continue;
   }
  if (p_no!=old_p_no) {
   fprintf(h_idx_fp,"Page %d%s",p_no,LINE_END);
   old_p_no=p_no;
  }
  convert();
  fclose(infile);
  fclose(outfile);
  remove(argv[i]);
  // overwrite original file
  rename("tmp.$$$",argv[i]);
 }
 fclose(c_idx_fp);
 fclose(h_idx_fp);
}
```

- 18 -
APPENDIX 2

```
-- Project : Business Day Interactive
-- File Name: Movie Script.c
-- Abstract: Main script containing handlers
-- Revision: 1.5
-- Date:    10/10/94
--
-- Author:   Mischka Hughes
--
-- Audit Trail
--    Rev 1.00 10/10/94
--
-- All rights reserved. No reproduction, copy or transmission of
-- this program (in source form, compiled form or any other form)
-- and any of the files associated with it, may be made without
-- written permission from the author.
-- No sub-section of this program (in source form, compiled form or
-- any other form) and any of the files associated with it, may
-- be reproduced, copied or transmitted save with written permission
-- from the author, or in accordance with the provisions of the
-- Copyright Act 1956 (as amended).
-- Any person who does any unauthorised act in relation to this
-- program (or the associated files) may be liable to criminal
-- prosecution and civil claims for damages.
--
--
-- (C) Infosis 1994
--
--***********************************************************/
-- Initialise routines on startMovie
  showSplashScreen
  cursor 4
  setUpEditionMenu
  global maxPages,maxStories,maxCaptions,sectorList
  global cur_sec,cur_sec_offset
  global cur_page,cur_story,cur_story_offset
  global psList
  global coIdxFName,hlIdxFName
  global storyExt,sectorExt,captionExt
  global addressDisplayed
  global oldFrame
  global RolledOver
  put 12 into maxPages
  put 8 into maxStories
  put 5 into maxCaptions
  set sectorList=list
("Gilt","Bank","Brewer","Building","BusServ","Electric","EngMetal"¬
,"Foodhot","Healthou","Indust","Insur","Leisure","Media","Mine","MineGld",¬
"MotAir","Newsprin","Oil","PlasChem","Property","Planta","Reclss","StorClo",¬
"Textile","TransP","Trust","UnSec","ForthFlo","ComDol","NewYork","Canada",¬
"France","Switz","Germany","Italy","NethL","Sweden","Spain")
```

- 19 -

```
set psList=list()
repeat with p=1 to maxPages
  repeat with s = 1 to maxStories
    append psList, "p"&p&"s"&s
  end repeat
end repeat
-- globals for text searching
put 1 into cur_sec
put 0 into cur_sec_offset
put 1 into cur_page
put 1 into cur_story
put 0 into cur_story_offset
put "company.idx" into coIdxFName
put "headline.idx" into hIIdxFName
put ".txt" into storyExt
put ".sec" into sectorExt
put ".cap" into captionExt
put TRUE into addressDisplayed
put EMPTY into oldFrame
put 0 into rolledOver
cursor -1
updatestage
end startMovie
```

Editions.
The edition menu will have an item activated if the movie corresponding is present in either the current directory or the specified working directory

```
on setUpEditionMenu
  global BDToday
  installMenu cast "Edition Menu"
  -- now check which editions exist and activate the menu items
  -- first get the date
  put the abbr date into ad
  put offset(" ", ad) into idx
  put char 1 to idx-1 of ad into dayText
  put char idx+1 to idx+3 of ad into monText
  put "BD" & dayText & monText into BDToday
  if objectP(fio) then fio(mDispose)
  put 1 into theItem
  repeat with x = charToNum ("A") to charToNum ("F")
    put BDToday & numToChar (x) & ".DIR" into fileName
    put fileIO(mNew,"read",the pathName & fileName) into fio
    if objectP(fio) then
      put x
      set the enabled of menuItem theitem of menu "Edition" to TRUE
      fio(mDispose)
    end if
    put theItem + 1 into theItem
  end repeat
end
```

- 20 -

```
-- loadEdition loads the edition specified
on loadEdition ed
  global BDToday
  put BDToday & ed & ".DIR" into fileName
  go to frame "index" of movie fileName
end
```

**Implement PC button functionality to the selection of text from an index.
Hilight on mousedown
Remain hilighted on roll off and mouse still down
Selection successful on mouse up only if over selection (i.e. still hilighted)**
*textClick* **handler should be called by a text cast member, parameters being the number of the cast member and the mouseline
The return value is TRUE if the line has been selected**

```
on textClick x,y
  put y into tmp
  if tmp = -1 then exit
  hilite line tmp of field x
  put TRUE into stat
  repeat while the mousedown
    if (the mouseCast = x) and (the mouseLine=tmp) then
      if (stat=FALSE) then
        hilite line tmp of field x
        set stat to TRUE
      end if
    else
      if (stat=TRUE) then
        set the textAlign of field x to "left"
        set stat to FALSE
      end if
    end if
  end repeat
  if stat = TRUE then
    --set the textAlign of field x to "left"
    --   textevent word (the number of words of line tmp of field x - 1) of line tmp of field x
    return TRUE
  end if
  return FALSE
end textClick
```

*LoadStories* uses the global variables maxPages and maxStories and searches through every combination of p?s? in the current directory. If a file is found it is put into the cast member of the same name. It is important therefore that there are enough named cast members to hold all the possible combinations... eg p1s1 to p6s8 if maxPages=6 and maxStories=8.

```
on loadStories
  global maxPages,maxStories,storyExt
```

- 21 -

```
    cursor 4
    if objectP(fio) then fio(mDispose)
    repeat with p=1 to maxPages
      repeat with s=1 to maxStories
        put "p" & p & "s" & s into fileName
        put fileIO(mNew,"read",the pathName & fileName & storyExt) into fio
        if objectP(fio) then
          put fio(mReadFile) into field fileName
          fio(mDispose)
        else
          put empty into field fileName
        end if
      end repeat
    end repeat
    cursor -1
end
```

Load the picture captions beneath each picture

```
on loadCaptions
    global maxPages,maxCaptions,captionExt
    cursor 4
    if objectP(fio) then fio(mDispose)
    repeat with p=1 to maxPages
      repeat with s=1 to maxCaptions
        put "p" & p & "c" & s into fileName
        put fileIO(mNew,"read",the pathName & fileName & captionExt) into fio
        if objectP(fio) then
          put fio(mReadFile) into field fileName
          fio(mDispose)
        else
          put empty into field fileName
        end if
      end repeat
    end repeat
    cursor -1
end
```

*LoadSectors* uses the global variable sectorList as defined in the startMovie handler to load the sector files from disk.
There must be an entry for each file you want to load in this list and also a corresponding text cast member of the same name.
The disk files must have the same name.

```
on loadSectors
    global sectorExt
    put count (sectorList) into cnt
    if cnt=0 then exit
    cursor 4
    if objectP(fio) then fio(mDispose)
    repeat with el=1 to cnt
      put getAt(sectorList,el) into sec
      put fileIO(mNew,"read",the pathName & sec & sectorExt) into fio
```

- 22 -

```
    if objectP(fio) then
      put fio(mReadFile) into field sec
      fio(mDispose)
    end if
  end repeat
  cursor -1
end loadSectors
```

Load the index page

```
on loadIndex
  global coldxFName,hIldxFName
  cursor 4
  if objectP(fio) then fio(mDispose)
  put fileIO(mNew,"read",the pathName & hIldxFName) into fio
  if objectP(fio) then
    put fio(mReadFile) into field "index"
    fio(mDispose)
  end if
  put fileIO(mNew,"read",the pathName & coldxFName) into fio
  if objectP(fio) then
    put fio(mReadFile) into field "company"
    fio(mDispose)
  end if
  cursor -1
end
```

Hilite (in shares page) the sector we are currently viewing used when a company is searched for using "find", so that the user knows which sector they are looking at. Not entirely necessary as the sector is displayed in the shares window, but looks better and gives positive feedback.

```
on hiliteSector idx
  put getAt(sectorList,idx) && "*" into sec
  repeat with x = 1 to the number of lines of field "main sector list"
    if line x of field "main sector list" contains sec then
      put empty before line x of field "main sector list"
      hilite line x of field "main sector list"
      exit
    end if
  end repeat
end
```

Find company name within all the sectors used in conjunction with hiliteSectorText
If the company is found the shares window is scrolled to the share, the company is highlighted and hiliteSectorText is called.
The search wraps.

```
on findSectorText
  global cur_sec,cur_sec_offset
  put the text of field "sectortextfinder" into txt
```

- 23 -

```
    if txt=EMPTY then exit
    put count (sectorList) into cnt
    if cnt=0 then exit
    if cur_sec>cnt then exit
    cursor 4
    repeat with el=cur_sec to cnt
      put cur_sec_offset+1 into cur_sec_offset
      put getAt(sectorList,el) into sec
      put offset(txt, char cur_sec_offset to 5000 of field sec) into res
      if res<>0 then
        put res+cur_sec_offset-1 into cur_sec_offset
        put el into cur_sec
        hiliteSector cur_sec
        put field sec into field "sectorText"
        put empty before char cur_sec_offset of field "sectorText"
        hilite char cur_sec_offset to cur_sec_offset+length(txt)-1 of field
"sectorText"
        hilite field "sectortextfinder"
        cursor -1
        exit
      end if
      put 0 into cur_sec_offset
    end repeat
    repeat with el=1 to cur_sec
      put cur_sec_offset+1 into cur_sec_offset
      put getAt(sectorList,el) into sec
      put offset(txt, char cur_sec_offset to 5000 of field sec) into res
      if res<>0 then
        put res+cur_sec_offset-1 into cur_sec_offset
        put el into cur_sec
        hiliteSector cur_sec
        put field sec into field "sectorText"
        put empty before char cur_sec_offset of field "sectorText"
        hilite char cur_sec_offset to cur_sec_offset+length(txt)-1 of field
"sectorText"
        hilite field "sectortextfinder"
        cursor -1
        exit
      end if
      put 0 into cur_sec_offset
    end repeat
    put "not found" into field "sectortextfinder"
    hilite field "sectortextfinder"
    cursor -1
  end findSectorText
```

**Search for text in all stories. This version wraps if text is found.
The story text window is scrolled to make the found text visible within
the window and the matching text is hilighted**

```
on findStoryText
  global cur_page,cur_story,cur_story_offset,psList
  put the text of field "storyTextFinder" into txt
```

- 24 -

```
if txt = EMPTY then exit
cursor 4
put the frameLabel into fram
put count(psList) into cnt
put 0 into cur_fram
repeat with x = 1 to cnt
  if getAt(psList,x) = fram then
    put x into cur_fram
    exit repeat
  end if
end repeat
if cur_fram=0 then set cur_fram = 1
repeat with x = cur_fram to cnt
  put cur_story_offset+1 into cur_story_offset
  put getAt(psList,x) into the_fram
  put offset(txt,char cur_story_offset to 10000 of field the_fram) into res
  if res <> 0 then
    put res + cur_story_offset-1 into cur_story_offset
    go to frame the_fram
    updatestage
    put empty before char cur_story_offset of field the_fram
    hilite char cur_story_offset to cur_story_offset+length(txt)-1 of field
the_fram
    hilite field "storytextfinder"
    cursor -1
    exit
  end if
  put 0 into cur_story_offset
end repeat
repeat with x = 1 to cur_fram
  put cur_story_offset+1 into cur_story_offset
  put getAt(psList,x) into the_fram
  put offset(txt,char cur_story_offset to 10000 of field the_fram) into res
  if res <> 0 then
    put res + cur_story_offset-1 into cur_story_offset
    go to frame the_fram
    updatestage
    put empty before char cur_story_offset of field the_fram
    hilite char cur_story_offset to cur_story_offset+length(txt)-1 of field
the_fram
    hilite field "storytextfinder"
    cursor -1
    exit
  end if
  put 0 into cur_story_offset
end repeat
put "not found" into field "storytextfinder"
hilite field "storytextfinder"
cursor -1
end
```

Hide the green lines which are not active

- 25 -

```
on hideAllBut x
  repeat with y = 14 to 23
    if y<> x then set the visible of sprite y to FALSE
  end repeat
end
```

*Greenline* is used to indicate which story the reader is currently viewing by displaying a coloured (green) rectangle surrounding the story on the bitmap page which corresponds to the story displayed within the scrolling story text box.
*Greenline* works on the rollover. As the user rolls over a story on the bitmapped page the hilight appears. If a story appears within the bounding rectangle of another story the it takes precedence over the surrounding story. This ensures that all stories are acessible and only one story is hilighted at any time.

```
on greenLine
  global rolledOver
  if rolledOver <> 0 then
    if not rollover(rolledOver) then
      set the visible of sprite rolledOver to FALSE
      put 0 into rolledOver
    end if
  end if
  repeat with x = 23 down to 14
    if rollover(x) then
      set the visible of sprite x to TRUE
      put x into rolledOver
      hideAllBut x
      updateStage
      exit
    end if
  end repeat
end
```

Display the caption on rollover
If a picture has a caption, it is displayed in the address field at the foot of the stage. Captions are displayed on the rollover and removed on the rolloff.
If there is no caption the address for the Ev.Standard is displayed.

```
on captionRollover
  global addressDisplayed
  repeat with x = 38 to 42
    if rollover(x) then
      put length (the framelabel ) into len
      if the framelabel = "company" then put "p2" into page
      else if the framelabel = "index" then put "p1" into page
      else if the framelabel = "graph" then put "p1" into page
      else if the framelabel = "cartoon" then put "p1" into page
      else put char 1 to len-2 of the framelabel into page
      put page & "c"& x-37 into i
      put the text of field i into field "stanCapfield"
```

- 26 -

```
    set addressDisplayed to FALSE
    updateStage
    exit
   end if
  end repeat
  if addressDisplayed = FALSE then
    put the text of field "Stan address" into field "stanCapfield"
    set addressDisplayed to TRUE
    updateStage
  end if
end
```

New butttonclick routine gives PC style functionality to button.
The same functionality as textclick but a cast number is supplied for the button - down and button up symbols instead of using hilite.
Selection is handled in score script using "if rollover <spr>"

```
on bc spr,bdown,bup
  repeat while the stilldown
    if rollover (spr) then
      set the castnum of sprite spr to bdown
      updatestage
    else
      set the castnum of sprite spr to bup
      updatestage
    end if
  end repeat
end bc
```

Shift text to the top of scrolling box. This must be done explicitly hide green lines

```
on enterFrame
  global oldFrame,rolledOver
  if the frameLabel = oldFrame then exit
  put the frameLabel into oldFrame
  hideAllBut 0
  if char 1 of the frameLabel <> "p" then exit
  put 0 into rolledOver
  put the frameLabel into oldFrame
  --set the text to the top of the scrolling box
  put empty before field oldFrame
  put offset("s",the frameLabel) into pos
  put value (char pos+1 of the framelabel )+13 into spr
  set the visible of sprite spr to TRUE
  updatestage
end
```

Show splashscreen and wait for keypress or mouseclick
This is to be replaced with a separate executable displaying the splashscreen and credits and then calling an external movie

```
on showsplashscreen
```

- 27 -

```
  set the keydownscript to "splashKey"
  set the mouseDownScript to "splashMouse"
end on splashKey
  go to frame "index"
  updatestage
  set the keydownscript to EMPTY
  set the mouseDownScript to EMPTY
  dontpassevent
end on splashMouse
  go to frame "index"
  updatestage
  set the keydownscript to EMPTY
  set the mouseDownScript to EMPTY
  dontpassevent
end
```

What is claimed is:

1. An information display system comprising:
   data access means to access page image data comprising graphical images of pages of a publication and text data, said page image data comprising graphical images of both text and non-text matter, said text matter including a plurality of predefined passages of text which are arranged on the page in an ordering indicating their relative importance in relation to other text passages on the page, and said text data comprising a plurality of predefined passages of text corresponding to text passages appearing in the graphical images of the pages of the publication;
   display means to display a graphical image of a page of the publication simultaneously with display of text data corresponding to a text passage appearing in the graphical image of the displayed page; and
   selection means operable by a user to select a text passage appearing in the graphical image of the page displayed by said display means;
   said display means being responsive to said selection means and said data access means to simultaneously display the graphical image of the page of the publication accessed from said page image data alongside the selected passage of text accessed from said text data such that the user can view the text passage in detail as text data while being apprised of its relative importance in relation to the other text passages through viewing the simultaneous display of the graphical image of the page.

2. An information display system as claimed in claim 1 including publication contents means to access a list of contents of said plurality of predefined passages of text, wherein said display means is adapted to simultaneously display at least a part of a page of said images and said list of contents in response to said selection means, and said selection means is operable by a user to select a said predefined passage of text using said list of contents whereby said display means is adapted to simultaneously display the selected said predefined passage of text and a corresponding page of said images containing a graphical image of said predefined passage of text.

3. An information display system as claimed in claim 1 including passage scroll means operable by a user to change the predefined passage of text of said text data being displayed by said display means to a next or previous passage of text; said display means being adapted to change if necessary the simultaneously displayed page of said images to display a page of said image containing an image of said next or previous predefined passage of text.

4. An information display system as claimed in claim 1 including page scroll means operable by a user to change the page of said images being displayed by said display means to a next or previous page; said display means being adapted to change the simultaneously displayed predefined passage of text of said text data to display the first predefined passage of text appearing on said displayed page of said images.

5. An information display system as claimed in claim 1 wherein said display means is adapted to highlight said selected portion of the displayed page of said images including said predefined passage of text and any associated non-text matter.

6. An information display system as claimed in claim 1 wherein said user selection means comprises a cursor movement device to move a cursor displayed by said display means to a portion of said display displaying said selected portion of a page of said images.

7. An information display system as claimed in claim 1 including information access means to access further information related to identifier words in said predefined passages of text of said text data, wherein said predefined passages of text of said text data include identifier words, wherein said display means is adapted to highlight any said identifier words appearing on said display in a said predefined passage of text of said text data, including text identifier word selection means operable by a user to select a highlighted identifier word on said display, whereby said display means is adapted to display said further information accessed by said information access means.

8. An information display system as claimed in claim 7 wherein said display means is adapted to simultaneously display said further information and said page of said images.

9. An information display system as claimed in claim 7 wherein said information access means is further adapted to access further information related to predetermined portions of said displayed page of said images for which said text data has no corresponding passage of text, and said selection means is adapted to select a said predetermined portion of said displayed page of said images for which said text data has no corresponding passage of text, whereby said display means is adapted to display said further information related to said predetermined portion of said displayed page.

10. An information display system as claimed in claim 9 wherein said display means is adapted to simultaneously display said further information and said page of said images.

11. An information display system as claimed in claim 1 wherein at least a portion of said text comprises financial information including equity prices, including financial information access means to access further information related to said financial information including the latest market equity prices, and said display means is adapted to display said further financial information including said latest market equity prices simultaneously with a graphical image of said financial information when said financial information is selected by said selection means.

12. An information display system as claimed in claim 11 including financial information index means to access an index of said financial information; financial information selection means operable by a user to select to display said financial information index whereby said display means displays said financial information index; and financial information index selection means to select a particularly piece of financial information from said financial information index, whereby said display means is adapted to simultaneously display a graphical image of said financial information containing said selected piece and associated said further financial information.

13. An information system as claimed in claim 7 including identifier word index means to access an index of identifier words appearing in said plurality of predetermined passages of text of said text data; identifier word index selection means operable by a user to select to display the identifier word index whereby said display means displays said identifier word index; and index identifier word selection means to select an identifier word from said identifier word index, whereby said display means is adapted to display a said predetermined passage of text of said text data containing said identifier word and to simultaneously display the page of said images containing said predetermined passage of text.

14. An information display system as claimed in claim 1 including text string input means operable by a user to input a text string to be located in said plurality of predefined passages of text of said text data; and text string location means to receive an input text string to be located from said text string input means, and to locate a said predefined passage of text of said text data in which said text string appears; wherein said display means is adapted to display the predefined passage of text in which said text string appears, and to simultaneously display a corresponding said page of said images.

15. An information display system as claimed in claim 1 including text scroll means operable by a user to scroll said predefined passage of text displayed by said display means up or down if said predefined passage of text cannot all be displayed by said display means at once.

16. An information display system as claimed in claim 2 including index scroll means operable by a user to scroll said list of contents displayed by said display means up or down if said list of contents cannot all be displayed by said display means at once.

17. An information display system as claimed in claim 13 including identifier word index scroll means operable by a user to scroll said identifier word index displayed by said display means up or down if said identifier word index cannot all be displayed by said display means at once.

18. An information display system as claimed in claim 13 wherein said publication is published as a plurality of modified versions, said identifier index means being adapted to access an index of identifier words and indicators of the versions in which said identifier words appear, said display means being adapted to display said identifier word index and said indicators.

19. An information display system as claimed in claim 1 wherein at least one said predefined passage of text of said text data has associated with it a processed image orginating from an image associated with said predefined passage of text in a corresponding portion of the displayed page of said images, said data access means being adapted to access said processed image when accessing the predefined passage of text, and said display means being adapted to simultaneously display said processed image, said associated predefined passage of text, and said page of said images containing said corresponding portion.

20. An information display system as claimed in claim 19 including image interaction means operable by a user to interact with said processed image and manipulate said processed image.

21. An information display system as claimed in claim 20 including further information access means to access further information related to said processed image, wherein said image interaction means is adapted to allow said processed image to be manipulated to include said further information.

22. An information display system as claimed in claim 1 including receiving and storage means to receive and store said data; image processing means to process the received graphical images to improve their definition; user definition means operable by a user to define said portions of a page of said images; and correlation means to correlate said portions with said passages of text.

23. An information display system as claimed in claim 20 including contents generation means to generate a list of contents for storage in said storage means, said list being formed as a list of said passages of text in order of importance attached to said passages of text for each page of said images based on the appearance of said passages of text in each said page.

24. An information display system as claimed in claim 22 including identifier word index generation means to generate an index of identifier words in said text data by searching through said text data for known said identifier words, flagging the identifier words located in said text data, and entering the located identifier words in said index.

25. An information retrieval and display system as claimed in claim 1 including identifier word index means to store an index of identifier words appearing in said passages of text; identifier word index selection means operable by a user to select to display the identifier word index whereby said display means displays said identifier word index; and identifier selection means to select an identifier word from said identifier index, whereby said display means is adapted to display a said passage of text containing said identifier word.

26. An information display system comprising:
data access means to access page image data comprising graphical images of pages of a publication and text data, said page image data comprising graphical images of both text and non-text matter wherein the text matter of each page is organized into separate text passages which are arranged on the page in an ordering indicative of their relative importance in relation to other text passages included on the page, and said text data comprising a plurality of predefined passages of text corresponding to text passages appearing in the graphical images of the pages of the publication;

display means including a screen area divided into a first display part in which a graphical image of a page of the publication is displayed, and a second display part arranged side-by-side with said first display part in which a selected text passage appearing in the graphical image of the page is displayed as text data in an enlarged view to allow a user to read the text passage in detail; and selection means operable by the user to select a text passage appearing in the graphical image of the page displayed in said first display part to cause the enlarged view of text data corresponding to the selected text passage to be simultaneously displayed in said second display part, such that the user can view the text passage in detail as text data while being apprised of its relative importance in relation to the other text passages through viewing the simultaneous display of the graphical image of the page.

27. A method for displaying a publication containing graphical and text information, comprising the steps of:
providing access to page image data comprising graphical images of pages of a publication and text data, said page image data comprising graphical images of both text and non-text matter wherein the text matter of each page is organized into separate text passages which are arranged on the page in an ordering indicative of their relative importance in relation to other text passages included on the page, and said text data comprising a plurality of predefined passages of text corresponding to text passages appearing in the graphical images of the pages of the publication;

providing a display in which a screen area is divided into a first display part in which a graphical image of a page of the publication is displayed, and a second display part arranged side-by-side with said first display part in which a selected text passage appearing in the graphical image of the page is displayed as text data in an enlarged view to allow a user to read the text passage in detail; and operating the display by allowing a user to select a text passage appearing in the graphical image of the page displayed in said first display part to cause the enlarged view of text data corresponding to the selected text passage to be simultaneously displayed in said second display part, such that the user can view the text passage in detail as text data while being apprised of its relative importance in relation to the other text passages through viewing the simultaneous display of the graphical image of the page.

\* \* \* \* \*